United States Patent
Bausch et al.

(10) Patent No.: US 10,527,078 B2
(45) Date of Patent: Jan. 7, 2020

(54) BREAKAWAY RETENTION DEVICE

(71) Applicant: HARRIS CORPORATION, Melbourne, FL (US)

(72) Inventors: Michael E. Bausch, Livonia, NY (US); Michael R. Mueller, Rochester, NY (US); Rollin Brown, Fairport, NY (US)

(73) Assignee: HARRIS GLOBAL COMMUNICATIONS, INC, Albany, NY (US)

( * ) Notice: Subject to any disclaimer, the term of this patent is extended or adjusted under 35 U.S.C. 154(b) by 628 days.

(21) Appl. No.: 15/161,447

(22) Filed: May 23, 2016

(65) Prior Publication Data
US 2017/0335874 A1   Nov. 23, 2017

(51) Int. Cl.
*F16B 5/12*   (2006.01)
(52) U.S. Cl.
CPC ..................... *F16B 5/126* (2013.01)
(58) Field of Classification Search
CPC ............... Y10T 403/60; Y10T 403/606; Y10T 403/602; Y10T 24/44573; Y10T 24/44581; Y10T 24/45052; Y10T 24/45215; Y10T 24/45362; Y10T 24/1391; Y10T 24/1394; Y10T 292/0808; Y10T 292/0811; Y10T 292/0815; Y10T 292/0824; Y10T 292/1038; Y10T 292/1074; F16M 11/041; A45F 2005/026; A45F 2005/025; A45F 5/02
USPC .................. 292/340; 224/197–200; 248/113, 248/225.11; 403/DIG. 3, DIG. 4, DIG. 14
See application file for complete search history.

(56) References Cited

U.S. PATENT DOCUMENTS

| 1,388,043 | A | * | 8/1921 | Johnson | A47L 13/512 |
| | | | | | 248/113 |
| 2,215,914 | A | * | 9/1940 | Coffey | E05C 17/52 |
| | | | | | 292/23 |
| 2,489,864 | A | * | 11/1949 | Cravener | B66C 1/10 |
| | | | | | 294/119.1 |
| 2,502,607 | A | * | 4/1950 | Vinton | E05B 65/0042 |
| | | | | | 292/23 |

(Continued)

FOREIGN PATENT DOCUMENTS

GB   2189540 A   10/1987
GB   2334299 A   8/1999

*Primary Examiner* — Matthieu F Setliff
(74) *Attorney, Agent, or Firm* — Fox Rothschild LLP; Robert J. Sacco; Carol E. Thorstad-Forsyth

(57) ABSTRACT

Breakaway retention device (100) is comprises a retained member (120) and a retention body (110). The retention member includes a retention knob (121). The retention body includes a housing having one or more resilient components (113a and 113b), two or more retention members (114a, 114b, 114a, and 114d), and a retention space (118). The retention space is at least partially defined by the retention members and configured to receive the retention knob when the retained member and the retention body are coupled together. The resilient components are disposed to resiliently maintain each of the retention members in a predetermined engagement position in the retention body to engage the retention knob when the retained member and the retention body are coupled together. The retained member and the retention body are prevented from being decoupled without the application of a predetermined force.

21 Claims, 10 Drawing Sheets

(56) References Cited

U.S. PATENT DOCUMENTS

| | | | | |
|---|---|---|---|---|
| 2,837,361 A * | 6/1958 | Loeb | ................ | E05C 19/04 |
| | | | | 292/15 |
| 2,860,893 A | 11/1958 | Clark | | |
| 2,869,952 A * | 1/1959 | Saunders | ................ | E05C 19/02 |
| | | | | 109/63.5 |
| 3,129,024 A * | 4/1964 | Schuessler | ............ | E05C 17/52 |
| | | | | 292/15 |
| 5,385,182 A | 1/1995 | Dyer | | |
| 5,850,996 A * | 12/1998 | Liang | ................ | A45F 5/02 |
| | | | | 248/221.11 |
| 6,010,306 A | 1/2000 | Bucher et al. | | |
| 6,030,009 A | 2/2000 | Stalgren et al. | | |
| 6,561,725 B1 * | 5/2003 | Ellis | ................ | B81C 3/008 |
| | | | | 24/453 |
| 6,708,380 B2 | 3/2004 | Schneider et al. | | |
| 7,159,833 B2 * | 1/2007 | Kato | ................ | H04M 1/0237 |
| | | | | 248/292.13 |
| 7,234,619 B2 * | 6/2007 | Hicks | ................ | B60N 3/00 |
| | | | | 224/281 |
| 8,021,071 B2 * | 9/2011 | Shim | ................ | B25J 19/063 |
| | | | | 403/328 |
| 8,221,248 B2 * | 7/2012 | Wang | ................ | B25J 19/063 |
| | | | | 464/162 |
| 8,366,560 B2 * | 2/2013 | Lee | ................ | F16D 7/10 |
| | | | | 464/160 |
| 2004/0206876 A1 * | 10/2004 | Kato | ................ | H04M 1/0237 |
| | | | | 248/349.1 |
| 2005/0092801 A1 * | 5/2005 | Hicks | ................ | B60N 3/00 |
| | | | | 224/547 |
| 2005/0093762 A1 | 5/2005 | Pick | | |
| 2006/0048351 A1 | 3/2006 | Casebolt et al. | | |
| 2007/0215772 A1 | 9/2007 | Nickel | | |
| 2009/0092442 A1 * | 4/2009 | Shim | ................ | B25J 19/063 |
| | | | | 403/327 |
| 2010/0307885 A1 * | 12/2010 | Wang | ................ | B25J 19/063 |
| | | | | 192/56.56 |
| 2011/0081976 A1 * | 4/2011 | Lee | ................ | B25J 19/06 |
| | | | | 464/37 |
| 2014/0205371 A1 * | 7/2014 | Bally | ................ | A61G 12/008 |
| | | | | 403/327 |
| 2015/0115008 A1 | 4/2015 | Griffith | | |

\* cited by examiner

US 10,527,078 B2

BREAKAWAY RETENTION DEVICE

BACKGROUND OF THE INVENTION

Statement of the Technical Field

This invention relates generally to a retention device, and more particularly to a retention device that permits a retained element to be detached from a retention body upon application of a predetermined force to either the retained element or the body.

Description of the Related Art

A retention system is required to provide mounting support and breakaway protection for components typically worn by soldiers or emergency personnel in the field. Such a system must provide robust functionality in harsh environments. Inadvertent disconnection is a concern in many applications where interruption of function would create hazardous conditions or have otherwise undesirable results or effects. Further, the retention system should reliably allow components to break free from their mounted position in emergency situations. This break free feature is a requirement in many stationary and mobile applications where personnel safety and equipment survival cannot be compromised. These applications require the original secure coupling or retention system plus a release feature that will allow the coupling to disconnect at a selectable, predetermined force.

Conventional breakaway retention systems are known, but the mechanisms used therein are commonly configured such that the breakaway functionality requires an application of force along a specific "line of force" direction. These systems also tend to be expensive and complicated mechanical arrangements which are not suitable for generic breakaway clamping uses. A further problem with many conventional breakaway retention systems is that they often require considerable space surrounding the mechanism to facilitate their function.

SUMMARY OF THE INVENTION

Embodiments of the invention concern a breakaway retention device. The breakaway retention device is comprised of a retained member and a retention body. The retained member is comprised of a retention knob. The retention body is comprised of a housing having one or more resilient components, two or more retention members, and a retention space. The retention space is at least partially defined by the retention members and configured to receive the retention knob when the retained member and the retention body are coupled together. The resilient components are disposed to resiliently maintain each of the retention members in a predetermined engagement position in the retention body to engage the retention knob when the retained member and the retention body are coupled together. The retained member and the retention body are prevented from being decoupled without the application of a predetermined force.

Embodiments of the invention also concern a method for providing breakaway coupling of two components. The method for providing breakaway coupling is comprised of securely attaching one of the two components to either one of a retention body or a retained member of a breakaway retention device. The method is also comprised of securely attaching other one of the two components to other one of either the retention body or the retained member of the breakaway retention device, and coupling the retained member to the retention body to provide breakaway coupling of the two components. The retained member is comprised of a retention knob. The retention body is comprised of a housing having one or more resilient components, two or more retention members, and a retention space. The retention space is at least partially defined by the retention members and configured to receive the retention knob when the retained member and the retention body are coupled together. The resilient components are disposed to resiliently maintain each of the retention members in a predetermined engagement position in the retention body to engage the retention knob when the retained member and the retention body are coupled together. The retained member and the retention body are prevented from being decoupled without the application of a predetermined force.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

As used herein, "breakaway force" refers to a force that causes a retained member and a retention body of a coupled retention device to decouple or disengage.

Figure 1:
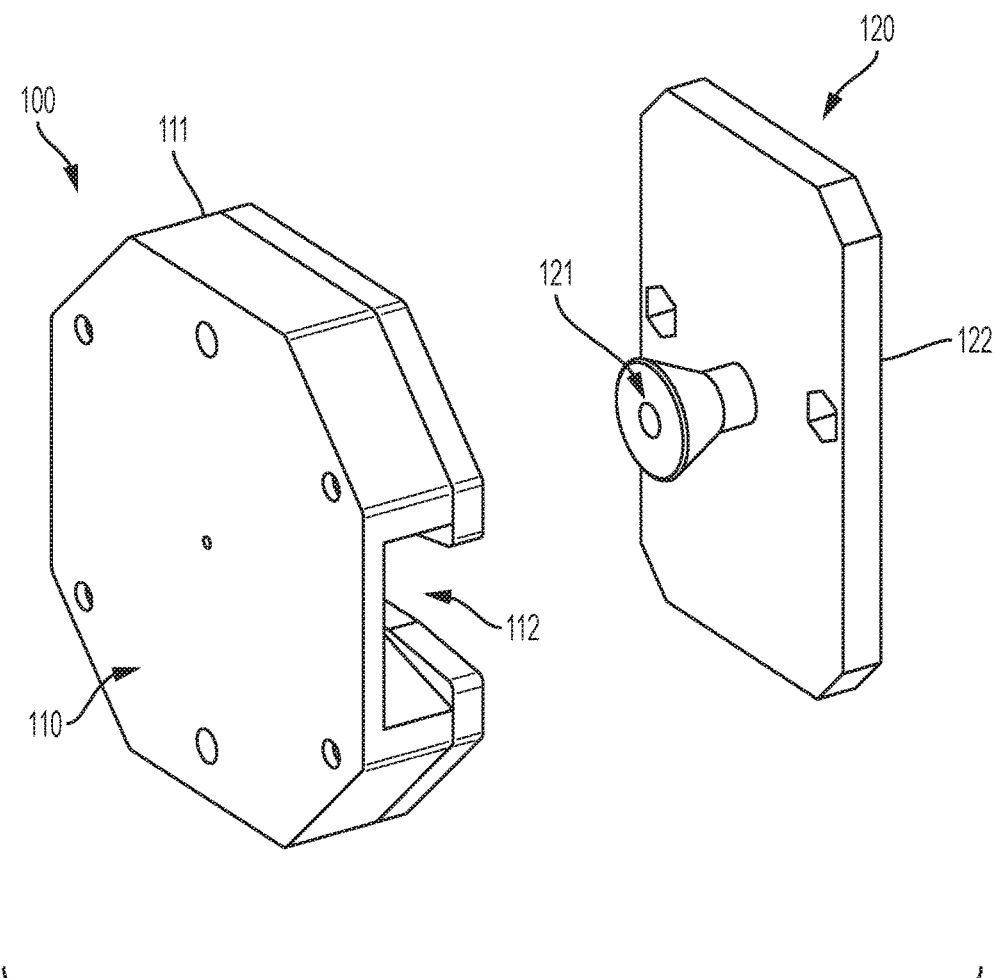
FIG. 1 illustrates a rear perspective view of an example breakaway retention device in which a retained member is shown detached from a retention body, according to an embodiment.

As is shown in FIG. 1, a breakaway retention device 100 can include a retention body 110 and a retained member 120 which can be used for breakaway coupling of two components (as discussed below with respect to FIG. 4A and FIG. 4B). In an embodiment, the retention body 110 and the retained member 120 can be configured for coupling to each other. Specifically, the retention body 110 and the retained member 120 can be configured such that they can be removably locked, attached, inserted, or fitted together to form a single coupled unit. For example, as shown in FIG. 1, a housing 111 of the retention body 110 can include an opening (or an aperture) 112 for receiving and/or engaging a retention knob 121 of the retained member 120. As discussed below with respect to FIG. 4A and FIG. 4B, when the retention body 110 and the retained member 120 of the breakaway retention device 100 engage, the retention knob 121 of the retained member 120 removably snaps, attaches, locks, fits into, or fastens in place within the opening 112 of the retention body 110. Furthermore, upon application of a suitable breakaway force, the retention knob 121 may be decoupled or detached from the opening 112 of the retention body 110 (as discussed below).

In an embodiment, both the retention body 110 and the retained member 120 can be made from a number of materials including, but not limited to, metals, rubbers, and plastics depending on the required use and/or a magnitude of a breakaway force.

Figure 2A:
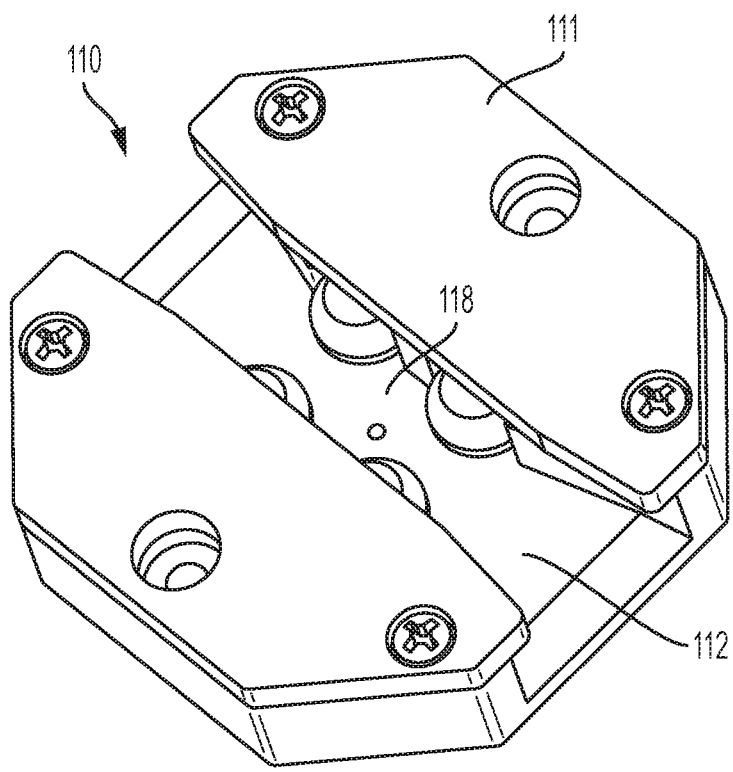
FIG. 2A illustrates a front perspective view of a retention body of an example breakaway retention device, according to an embodiment.

In an embodiment, both the retention body 110 and the retained member 120 can include one or more connector mechanisms for secure attachment of the retention body 110 and the retained member 120 to various components that need to be removably coupled together using a breakaway retention device 100. Examples may include, without limitation, ties, bolts, screws, adhesive, straps, or the like. In some scenarios the connector mechanism can comprise conventional MOLLE (Modular Lightweight Load-carrying Equipment) webbing or straps for attachment to tactical vests and the like. In an embodiment, a connector mechanism is chosen such that the retention body 110 and/or the retained member 120 remain securely fastened to the respective components and do not detach from components to which they are attached Referring now to FIG. 2A, FIGS. 2B, 2C, and 2D there are shown several views of an exemplary retention body 110 of a breakaway retention device according to an embodiment. As shown in FIG. 2A, the retention body 110 of the breakaway retention device includes an opening 112 formed in a housing 111. The opening can include a retention space 118 configured to receive and retain a retention knob of a corresponding retained member when coupled or engaged. In an embodiment, the opening 112 may have a circular, rectangular, square, oval, or any other desired cross-sectional shape depending on a required use of the breakaway retention device. In an embodiment, as shown in FIG. 2A, the opening 112 may be in the form of a channel surrounded by side walls on two opposing sides but open on the remaining sides. In an alternate embodiment, the opening 112 may have side walls all around the opening (not shown here). Alternatively and/or additionally, the opening may have side walls that include one or more slots (not shown here).

Figure 2B:
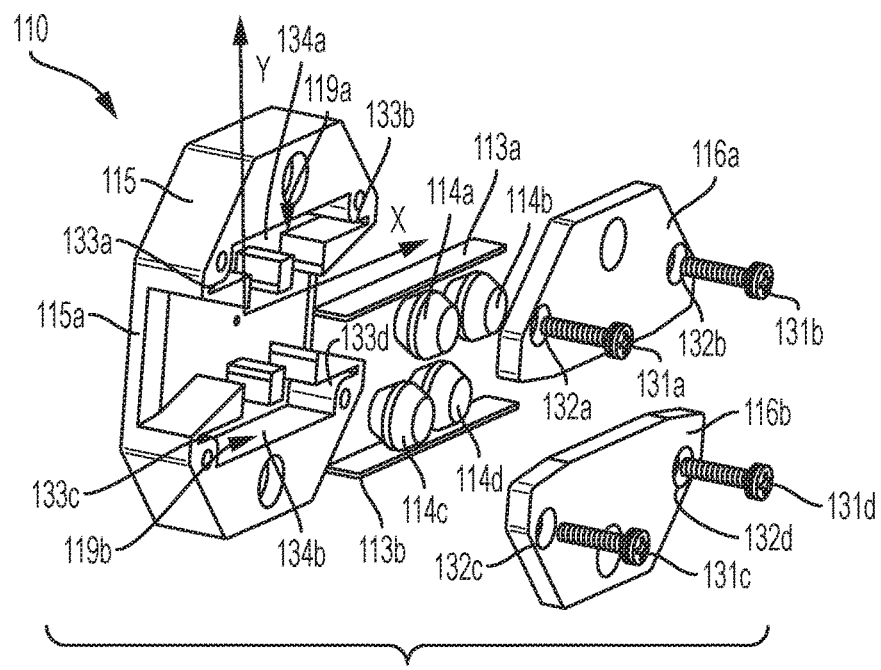
FIG. 2B illustrates an exploded view of a retention body of an example breakaway retention device, according to an embodiment.

Referring now to FIG. 2B, which shows an exploded view of the retention body 110, the housing 111 can include a housing shell 115 (including a back supporting plate 115a), and two supporting plates 116a and 116b. The two supporting plates can be secured to the housing shell 115 by suitable fasteners such as screws 131a, 131b, 131c, and 131d which are received in threaded holes 132a, 132b, 132c, and 132d. Alternatively adhesive or welding methods can be used to attach the supporting plates to the housing shell. The housing plates and the housing shell can be assembled together as shown to form an opening 112. In an embodiment, shapes of the housing shell 115, and the two supporting plates 116a and 116b may be circular, rectangular, square, oval, or any other desired shape depending on a desired shape of the housing 111, which in turn may depend upon a required use of the breakaway retention device. For example, the shape of the housing 111 may depend on the shapes of the components that will be coupled together using the retention device.

As shown in FIG. 2B, the housing 111 can also include one or more resilient components 113a and 113b. Examples of the resilient components may include, without limitation, a compression spring, a tension spring, a coiled spring, an resilient rubber member, a leaf spring, a compression foam, or the like. The resilient components 113a and 113b are chosen such that they can easily be deformed (i.e., flexed) without breaking, while returning to their initial position when the force that flexes the resilient components is interrupted. In an example embodiment, the resilient components 113a and 113b are both leaf springs. In an alternate embodiment, the resilient components 113a and 113b may have different characteristics such as the dimension, the spring constant, material or the like. Alternatively and/or additionally, the resilient components 113a and 113b may be different types of springs such as a coil spring and a leaf spring. While the example figures show two resilient components, it will be understood to those skilled in the art that the retention body 110 may include more resilient components without deviating from the principle of this disclosure.

Figure 2C:
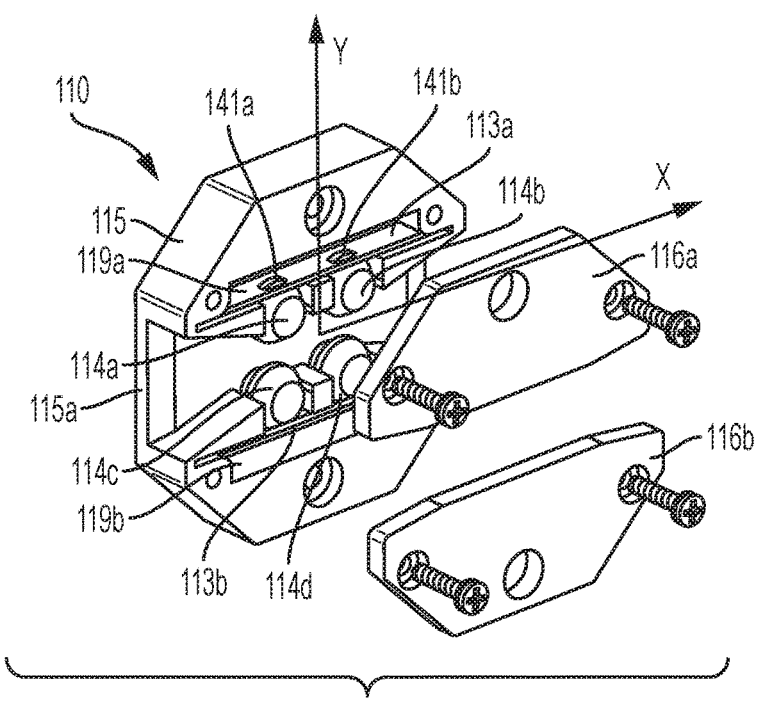
FIG. 2C illustrates a partial exploded view of a retention body of an example breakaway retention device, according to an embodiment.

In an embodiment, the resilient components 113a and 113b are each disposed in receiving channels 119a and 119b of the housing shell 115, respectively. As shown in FIG. 2B and FIG. 2C, receiving channels 119a and 119b are configured to receive the resilient components 113a and 113b in their resting state, and allow for flexing of the resilient components 113a and 113b. In an example embodiment, as shown in FIG. 2B and FIG. 2C, receiving channels 119a and 119b can each include a broad central regions 134a and 134b flanked by opposing narrow ends 133a, 133b, 133c, and 133d. When a resilient component in a resting state is mounted in the receiving channel, its ends fit within the opposing narrow ends of the receiving channel. In an embodiment, a thickness or clearance space defined by each of the narrow ends of a receiving channel may be configured such that it prevents the movement and/or displacement of a resilient component when the resilient component is in its resting state. In an alternate embodiment, a thickness or clearance space defined by the narrow ends of a receiving channel may be decreased (such as by tightening of a set screw) after placement of an resilient component in the channel. Consequently, movement and/or displacement of the resilient component in its resting state can be prevented. The broader central region of a receiving channel can be advantageously configured to allow for flexing of an resilient component upon application of force. For example, with reference to FIG. 2B and FIG. 2C, it can be observed that there is space provided in the receiving channels 119a, 119b so that resilient component 113a may flex upwards (i.e., in the +y direction) in channel 119a. Similarly, resilient component 113b may flex downwards (in the −y direction) in channel 119b, upon application of a suitable force. In an embodiment, resilient components 113a and 113b may flex about any point along their length depending on a direction of a force applied.

Referring back to FIG. 2B, FIGS. 2C, and 2D, the housing 111 of the retention body 110 can also include a plurality of retention members 114a, 114b, 114c, and 114d disposed in retention slots 140a, 140b, 140c, and 140d, respectively (FIG. 2D). In an embodiment, the retention members can each have a conical, frustum, or double frustum shape as described below. However, the invention is not limited in this regard and the may be cubical, spherical, egg shaped, prism shaped, disc shaped, conical, or the like. The retention members may all have the same shape or one or more of the retention members may differ in shape from each other. The exact shape selected for the retention member is not critical provided that the shape must have at least one surface which can be oriented in a manner as explained below to facilitate retention functions in a manner as hereinafter described.

In an embodiment, retention members 114a and 114b are secured, attached or positioned within the retention body so as to interact with resilient component 113a. Retention members 114c and 114d are similarly secured, attached or positioned within the retention body so as to movably interact resilient component 113b. In one scenario, the retention members 114a, 114b, 114c, and 114d may be directly attached to the respective resilient components. Any suitable attachment means can be used for this purpose. For example, the retention members can include a notch or channel which engages a pin or slotted portion of the resilient component so that the retention member is secured to the resilient component. Example channels 141a and 141b on resilient component 113a, for engaging portions of retention members 114a and 114b, are shown in FIG. 2C. Alternatively, or in addition, to such attachment means one or shaped portions of the housing 110 surrounding the retention members can be configured to help retain the retention members within the housing 110 and in engagement with the resilient components.

Figure 2E:
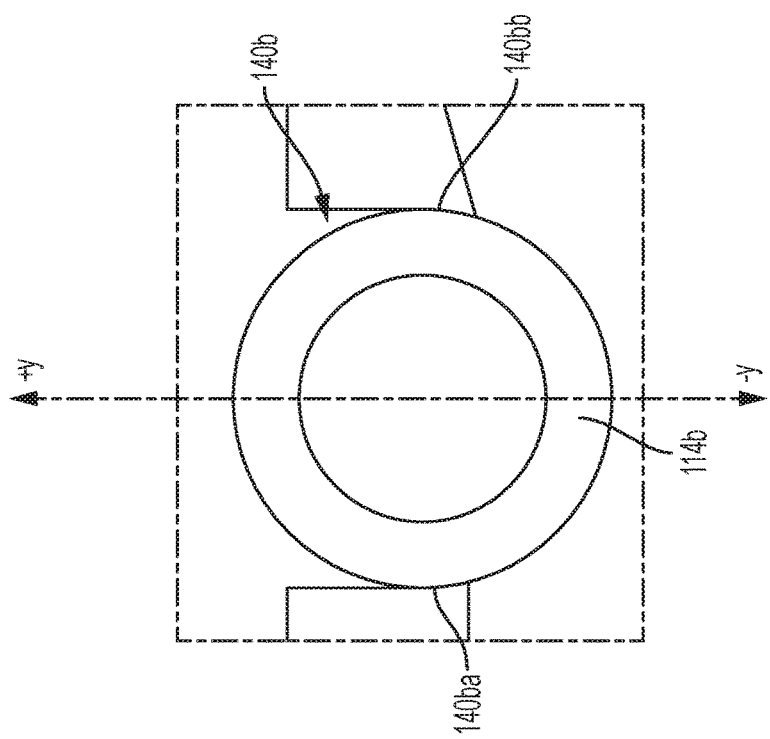
FIG. 2E illustrates an exploded view of a retention member disposed in a retention slot (in the inset), according to an embodiment.

For example, as shown in FIG. 2E that depicts an enlarged view of retention slot 140b, side walls 140ba and 140bb of retention slot 140b can be shaped so that they taper inwardly toward retention member 114b as the side walls extends in the −y direction, and curve around the periphery of the retention member. With the foregoing arrangement, the side walls 140ba and 140bb can advantageously limit movement (i.e., in the −y direction) of the retention member 114b. Further, the resilient component 113a resiliently biases the retention member 140b toward the −y direction so that the retention member is retained in the retention slot.

Figure 2D:
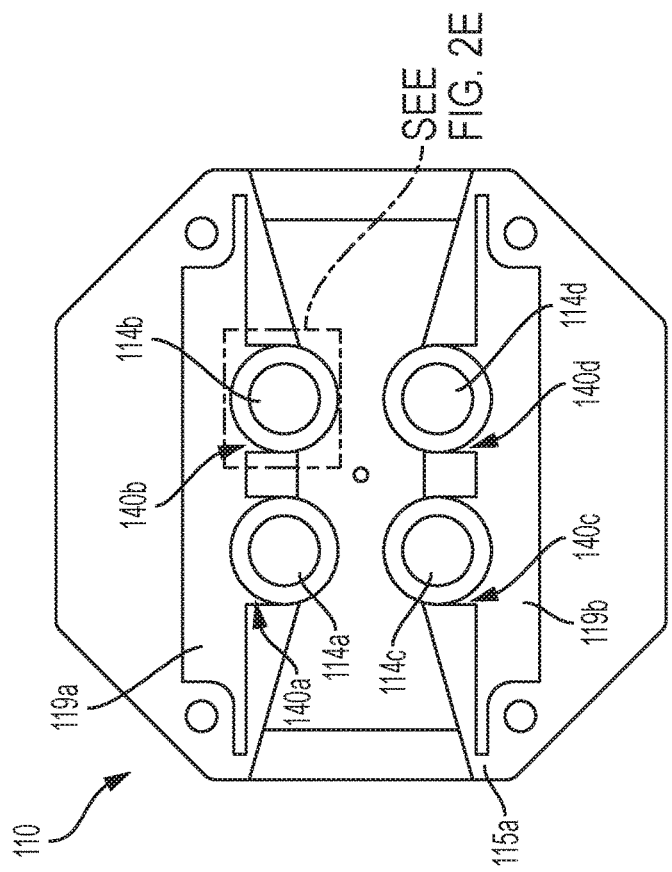
FIG. 2D illustrates a partial front view of a retention body of an example breakaway retention device, according to an embodiment.

Similarly, as shown in FIG. 2D, sidewalls of retention slot 140a can be advantageously shaped to limit movement (i.e., in the −y direction) of the retention member 114a. The resilient component 113a resiliently biases the retention member 114a in the −y direction so that the retention member is retained in the retention slot 140a. The sidewalls of retention members 140c and 140d can be advantageously shaped in a similar way to limit movement (i.e., in the +y direction) of the retention members 114c and 114d, respectively. The retention members 140c, 140d are resiliently biased in the +y direction so that they are each retained in their respective retention slot.

In an embodiment, retention members 114a, 114b, 114c, and 114d can further be held in place by attachment of supporting plates 116a and 116b to the housing shell 115. As shown in FIG. 2C, the retention members 114a, 114b, 114c, and 114d are configured to be held between the supporting plates 116a and 116b and the housing shell 115.

As shown in FIG. 2A, the retention members can be arranged such that they are disposed or distributed around a periphery of a retention space 118. Hence, the retention space 118 is defined at least in part by the sidewalls of the retention members. As noted above, the retention space is a space advantageously configured to receive and retain a retention knob of a corresponding retained member when coupled or engaged. In an embodiment, at least a part of a peripheral shape of a retention space 118 may depend upon a number and/or an arrangement of retention members that form the retention space. For example, 3 retention members may define a peripheral shape of a retention member that is different than that of a retention space that has 4 retention members distributed around its periphery, or the like.

In an embodiment, the retention members are advantageously beveled (i.e., have a sloping edge). More particularly, a retention member can be comprised of a portion having a largest diameter and/or dimension around about its center, which gradually reduces or tapers towards one or both ends. For example, in an example embodiment, a retention member has a largest diameter and/or dimension around about its center, which reduces or tapers towards at least the end that is closer to the back supporting plate 115a of the housing shell 115. Stated differently, at least a portion of each retention member can be shaped as a frustum, where the smaller diameter base of the frustum is adjacent to the back supporting plate 115a and the larger diameter base of the frustum is spaced away from the back supporting plate. In an embodiment shown in FIGS. 2A, 2B and 2C each retention member is configured in the form of a double frustum. As used herein, the phrase double frustum refers to a single body which has a solid shape, the shape comprising a first frustum and a second frustum each joined together at their larger diameter bases along a common central axis to define a single shape as shown.

The arrangement shown and described herein with respect to FIGS. 2A, 2B and 2C will allow for the movement of the retention members in one or more directions in a plane parallel to that of the back supporting plate 115a. For example, the example a retention body 110 shown in FIG. 2C allows for the movement of the retention members 114a, 114b, 114c, and 114d upwards (+y direction) and/or downwards (−y direction) along the shown y-axis. In an alternate embodiment, the retention members 114a, 114b, 114c, and 114d may also move along the x-axis. In yet another embodiment, the retention members 114a, 114b, 114c, and 114d may move at any angle in a plane parallel to that of the back supporting plate 115a. In an embodiment, the freedom of movement of the retention members 114a, 114b, 114c, and 114d in one or more directions may be adjusted for controlling direction and/or the magnitude of a breakaway force. In an embodiment, the freedom of movement of the retention members 114a, 114b, 114c, and 114d in one or more directions may be controlled by controlling the spring constants of the resilient components 113a and 113b.

Figure 3:
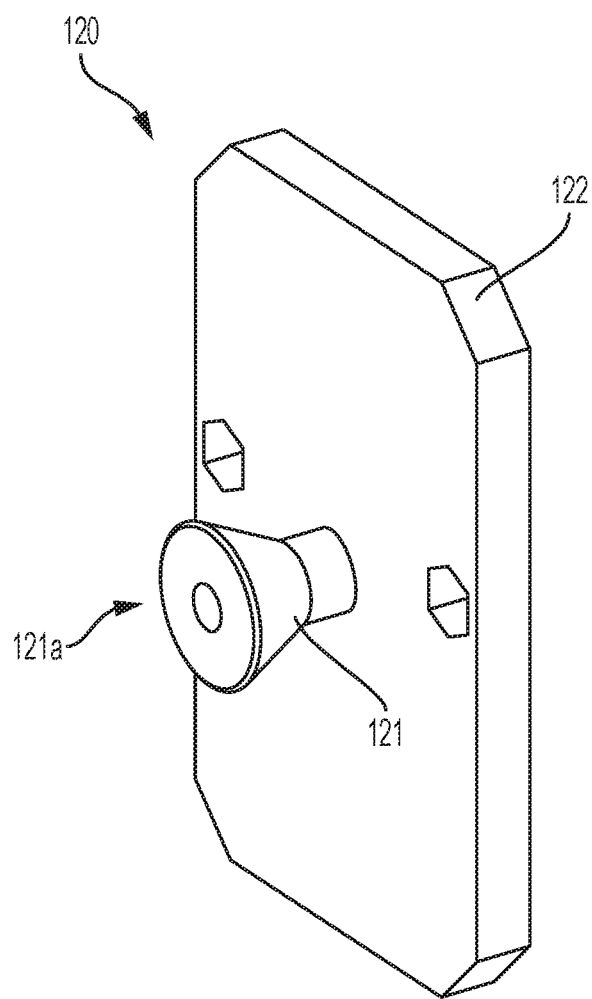
FIG. 3 illustrates a rear perspective view of a retained member of an example breakaway retention device, according to an embodiment.

FIG. 3 illustrates a retained member 120 of the breakaway retention device, according to an embodiment. The retained member 120 can include a retention knob 121 securely attached to a backing plate 122. In an embodiment, the retention knob 121 may include a free end 121a that is not attached to the backing plate 122. A shape of the free end 121a can be advantageously configured such that it can be received into and held in place in a retention space 118 of a complementary retention body 110 of the retention device. The shape of the free end 121a can further be configured to allow for detachment of the retention body 110 from the retained member 120 upon application of a breakaway force.

For example, for the retention space 118 described above (that has a maximum size adjacent to the back supporting plate 115a, which reduces in a direction away from the back supporting plate 115a and towards the supporting plates 116a and 116b, the free end 121a can be shaped as a frustum so that it is configured to be received in the retention space 118. The larger diameter base of the frustum shaped free end 121a when received into the retention space 118 is adjacent to the back supporting plate 115a, and the smaller diameter base of the frustum is aligned with or adjacent to a plane defined by the supporting plates 116a and 116b. In an embodiment, a diameter of the larger diameter base of the frustum shaped free end 121a is selected such that it cannot pass through the aperture of the retention space 118, where the aperture is defined in part by retention members attached to resilient components that are in a resting state. In an embodiment, a diameter of the larger diameter base of the frustum shaped free end 121a is greater than a distance between the larger diameter base portions of the frustum shaped retention members, when the resilient components attached to the frustum shaped retention members are in a resting state. Thus, the free end 121a of the retention knob 121 is held in place when the retention body 110 and the retained member 120 are coupled together, if the resilient components 113a and 113b are in a resting state. In an embodiment, the free end 121a may be cubical, spherical, egg shaped, prism shaped, conical, or the like.

In an alternate embodiment, the free end 121a may be a can be at least partially shaped as a sphere or an oblate spheroid configured to be received and retained within the frustum shaped retention space 118. In an embodiment, a diameter or a dimension of the spheroid shared free end 121a is selected such that it cannot pass through the aperture of the retention space 118, when the aperture is defined in part by retention members attached to resilient components that are in a resting state. In an embodiment, a maximum diameter of the spheroid shaped free end 121a is greater than an area of the aperture defined in part by sidewalls of the larger diameter base portions of the frustum shaped retention members, when the resilient components attached to the frustum shaped retention members are in a resting state. Thus, the free end 121a of the retention knob 121 is held in place when the retention body 110 and the retained member 120 are coupled together, if the resilient components 113a and 113b are in a resting state. In an embodiment, the disc shaped free end 121a may be a cube, a spheroid, a tetrahedron, a trunctated cone or any other suitable shape without limitation.

While the example figures show four retention members configured to receive one retention knob, it will be understood to those skilled in the art that the retention body 110 may include more or less retention members without deviating from the principle of this disclosure. For example, in an embodiment, the retention body may include 2, 3, 5, 6, or more retention members configured to receive one or more retention knobs. The retention members will be distributed around the periphery of the retention space. In some scenarios, the retention members can be evenly distributed so that all retention members are spaced an equal distance apart as shown in FIGS. 2A, 2B and 2C. However, the invention is not limited in this regard and in some scenarios it can be advantageous to arrange the retention members so that their spacing around the periphery of the retention space is not necessarily equal.

Figure 4A:
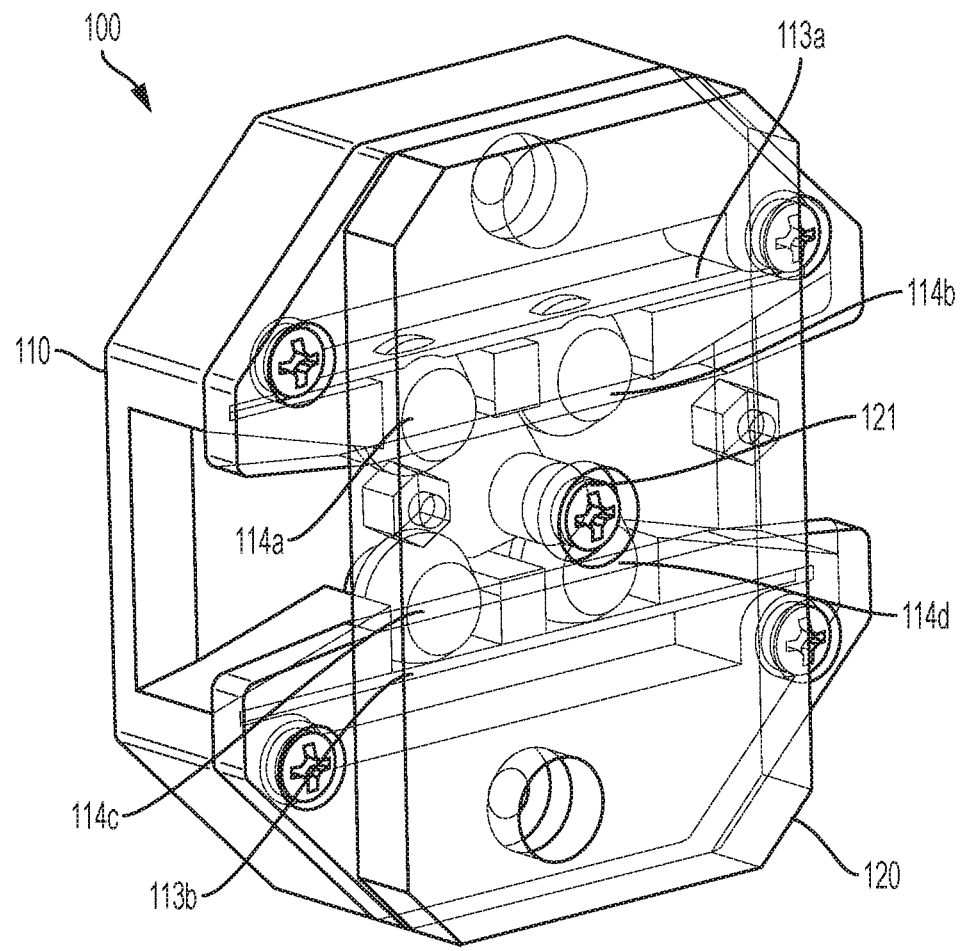
FIG. 4A is a wire frame drawing of a coupled breakaway retention device, according to an embodiment.

FIG. 4A illustrates a wire drawing of a breakaway retention device 100 in a coupled state where the retained member 120 is coupled to the retention body 110. FIG. 4B illustrates an exploded partial view of a breakaway retention device 100 in a coupled state, and the various points of contact between the retained member 120 and the retention body 110. As shown in FIG. 4A and FIG. 4B, a free end 121a of a retention knob 121 in the retained member 120 snaps, attaches, or fastens in place in the retention space 118 defined in part by retention members 114a, 114b, 114c, and 114d in the retention body 110. As noted above, the free end 121a of the retention knob 121 has larger diameter base configured to be received in the retention space 118, and held in place adjacent to the back support plate 115a when the resilient components are in a resting state, because the larger diameter base of the resilient knob cannot pass through the aperture of the resilient space. Hence, once engaged, the retention body 110 and the retained member 120 are firmly held together by the retention knob 121 and the beveled (or double frustum shaped) retention members 114a, 114b, 114c, and 114d.

In an embodiment, in order to decouple the retention body 110 from the retained member 120, a breakaway pulling force must be applied to one or both the retention body 110 and the retained member 120. As shown in FIG. 4B, upon application of a breakaway pulling force the free end 121a of the retention knob 121 whose larger diameter base cannot pass through an aperture of the retention space 118 (when the resilient components are in a resting state) exerts an outwards force on each of the retention members 114a, 114b, 114c, and 114d. The outwards force causes each of the retention members 114a, 114b, 114c, and 114d to move in the x and/or y direction (with respect to the plane of the housing shell), if the applied force is greater than the force required to deflect and/or flex one or both the resilient components 113a and 113b. At breakaway force, the aperture of the retention space 118 (when the resilient components are in flexed state) is greater in size than the larger diameter base of the free end 121a of the retention knob 121, such that the free end 121a can pass through the aperture, and the retention knob is decoupled from the retention space 118 of the retention body 110.

It should be noted a breakaway force need not be applied in only one direction (for example, outwards). In fact, a breakaway retention device of the current disclosure allows for decoupling of a retention body from a retained member irrespective of the direction of the breakaway force applied because the resilient components 113a and 113b may flex at any point along their length. For example, if the breakaway force is applied as a pulling force on the retention knob 121 in a direction perpendicular to the back supporting plate 115a, it will push all four retention members 114a, 114b, 114c, and 114d with an almost identical forces (assuming the four retention members are symmetrically arranged and are identical) such that resilient components 113a and 113b flex around about their middle points. The retention knob 121 may disengage or decouple from the retention space when the pulling force is greater than or equal to a breakaway force in magnitude such that the retention members are pushed out to make the opening of the retention space bigger than the size of the free end 121a.

In another example, if the breakaway force is applied as a pulling force on the retention knob 121 at an angle that is not perpendicular to the back supporting plate 115(*a*), it will push all four retention members 114*a*, 114*b*, 114*c*, and 114*d* with non-identical identical forces such that resilient components 113*a* and 113*b* flex around asymmetrical points along their length (the flexing point may or may not be the same for both resilient components). The retention knob 121 may disengage or decouple from the retention space when the pulling force is greater than or equal to a breakaway force in magnitude such that the retention members are asymmetrically pushed (i.e., the distance the retention members move is not the same for all the retention members) out to make the opening of the retention space bigger than the size of the free end 121*a*. In an embodiment, magnitude of a breakaway force required to cause decoupling may depend on the direction of the force applied.

In an embodiment, the magnitude and/or direction force required to deflect and/or flex a resilient component can be controlled or adjusted as a function of its spring constant. In an embodiment, the resilient components 113*a* and 113*b* and their respective characteristics may be chosen based on the desired direction and/or the magnitude of the breakaway force to pull apart or decouple a retained member from a retention body. For example, as is known to those skilled in the art that the spring constant of a leaf spring is directly proportional to its width and inversely proportional to its length. A person skilled in the art will also recognize that the effective length and/or an effective width of a leaf spring has a direct impact on its spring rate which is defined as the force required to deflect and/or flex the spring. Hence, the dimensions of a leaf spring may be varied to change the magnitude of a breakaway force. In an embodiment, characteristics of the resilient components 113*a* and 113*b* may be different from each other based on a required use of the breakaway retention device, and a magnitude and/or direction of the desired breakaway force. Similarly, the shape of the retention members can be different from each other based on a required use of the breakaway retention device to vary a magnitude and or direction of a force that is required to cause the retained member to and the retention body to separate.

In an alternate embodiment, flexing of one or both of the resilient components 113*a* and 113*b* can be controlled by one or more fulcrums disposed adjacent to the resilient components 113*a* and 113*b*. A fulcrum may control flexing of a resilient component in one or more directions, when a breakaway force is applied as a pulling force on the retention knob 121. For example, it will be understood to those skilled in the art that a resilient component will flex about the fulcrum upon application of a force, and hence the position of the fulcrum may determine the direction and/or the magnitude of a breakaway force. In an embodiment, a fulcrum may also limit the movement (direction and/or magnitude) of a retention member. In an embodiment, a fulcrum may include a drive arrangement for dynamically adjusting the position of the fulcrum such as sliding pin, or other such moveable fulcrum, that will allow for easy adjustment of the direction and/or the magnitude of a breakaway force.

Figure 5B:
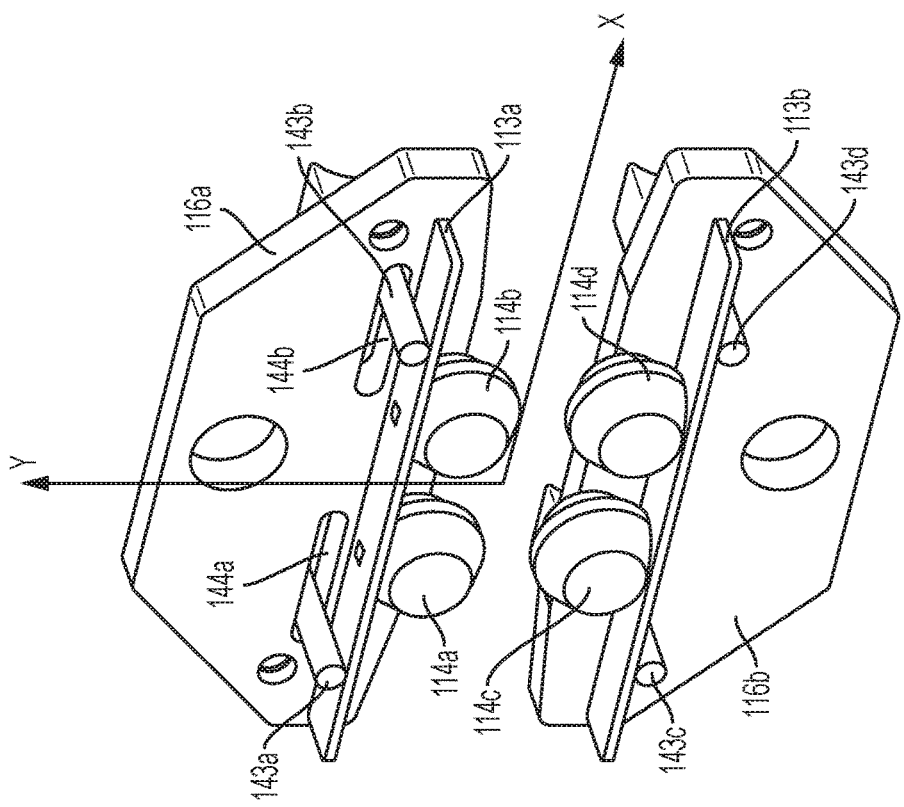
FIG. 5B illustrates a partial exploded view of a retention body of an example breakaway retention device, according to an alternate embodiment.
Figure 5A:
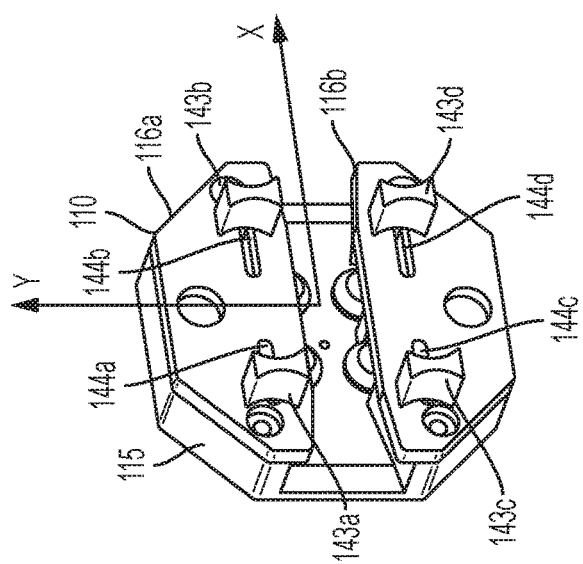
FIG. 5A illustrates a front perspective view of a retention body of an example breakaway retention device, according to an alternate embodiment.
Figure 5C:
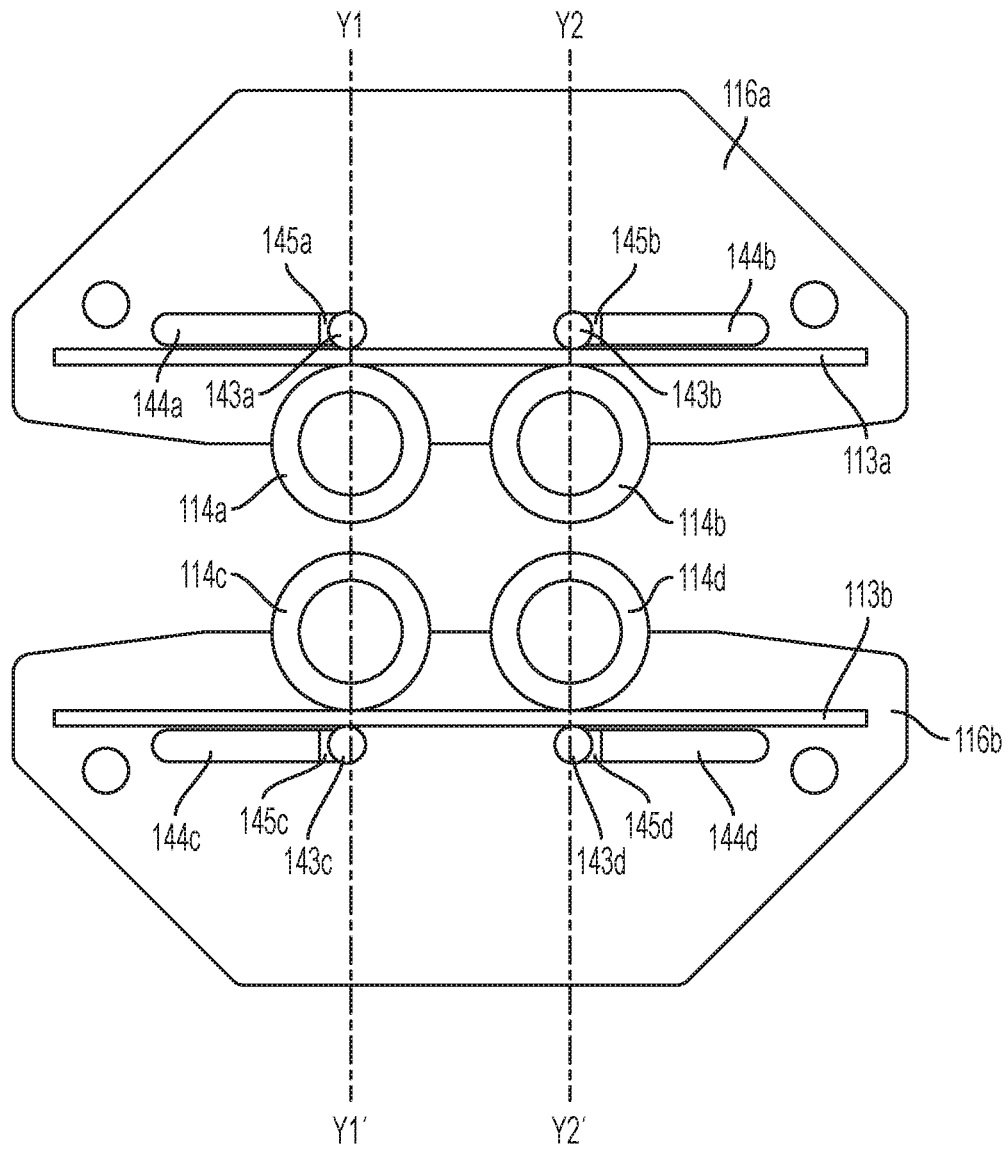
FIG. 5C illustrates a partial exploded view of a retention body, in a locked configuration, of an example breakaway retention device, according to an alternate embodiment.

FIG. 5A, FIGS. 5B, and 5C illustrate an example retention body 110 of a breakaway retention device that includes four moveable fulcrums 143*a*, 143*b*, 143*c*, and 143*d* disposed in channels 144*a*, 144*b*, 144*c*, and 144*d*, respectively. As shown in FIG. 5B and FIG. 5C, channels 144*a* and 144*b* are formed in supporting plate 116*a* and channels 144*a* and 144*b* are formed in supporting plate 116*b*. The channels are parallel to their respective resilient components, and are formed on a side of the respective resilient component that does not have the retention members 114*a*, 114*b*, 114*c*, and 114*d*. The channels are configured to allow for the movement of fulcrums disposed in the channels in a direction parallel to the resilient components (i.e., along the x-axis). In an embodiment, the end points 145*a*, 145*b*, 145*c*, and 145*d* of the channels 144*a*, 144*b*, 144*c*, and 144*d* lie on the same axes as the center points of the retention members 114*a*, 114*b*, 114*c*, and 114*d*, respectively (axes are shown as Y1-Y1' and Y2-Y2' in FIG. 5C). Position of one or more of the moveable fulcrums 143*a*, 143*b*, 143*c*, and 143*d* may be slidably varied to control and/or adjust a magnitude and/or a direction of a breakaway force, since the position of a fulcrum impacts the flexing point of its corresponding resilient component and/or the movement of its corresponding retention member.

In an embodiment, one or more of the retention members 114*a*, 114*b*, 114*c*, and 114*d* may also be locked into place to prevent breakaway. For example, as shown in FIG. 5C, a retention member may be locked into place to prevent its movement by positioning its respective fulcrum at the end point of its channel, that lies on the same axis as the center point of the retention member. FIG. 5C shows an example embodiment, in which all four retention members 114*a*, 114*b*, 114*c*, and 114*d* are locked into place by positioning their respective fulcrums 143*a*, 143*b*, 143*c*, and 143*d* at the end points 145*a*, 145*b*, 145*c*, and 145*d* of the channels 144*a*, 144*b*, 144*c*, and 144*d*. In an embodiment, temporarily locking of the retention members can facilitate prevention of any decoupling of retained member from a retention body in a coupled breakaway retention device, i.e., prevent breakaway of the breakaway retention device.

In an alternate embodiment, one or both of the resilient components 113*a* and 113*b* may be made temporarily inflexible, to prevent breakaway (or change the magnitude and/or direction of the breakaway force), by locking the resilient components to the housing shell 115. Examples of locking mechanisms may include, without limitation, a screw, a pin, or the like (not shown) that securely prevents a resilient component from flexing within a housing shell. In an embodiment, temporarily locking of one or both of the resilient components 113*a* and 113*b* can facilitate prevention of any decoupling of retained member from a retention body in a coupled breakaway retention device, i.e., prevent breakaway of the breakaway retention device.

Figure 4B:
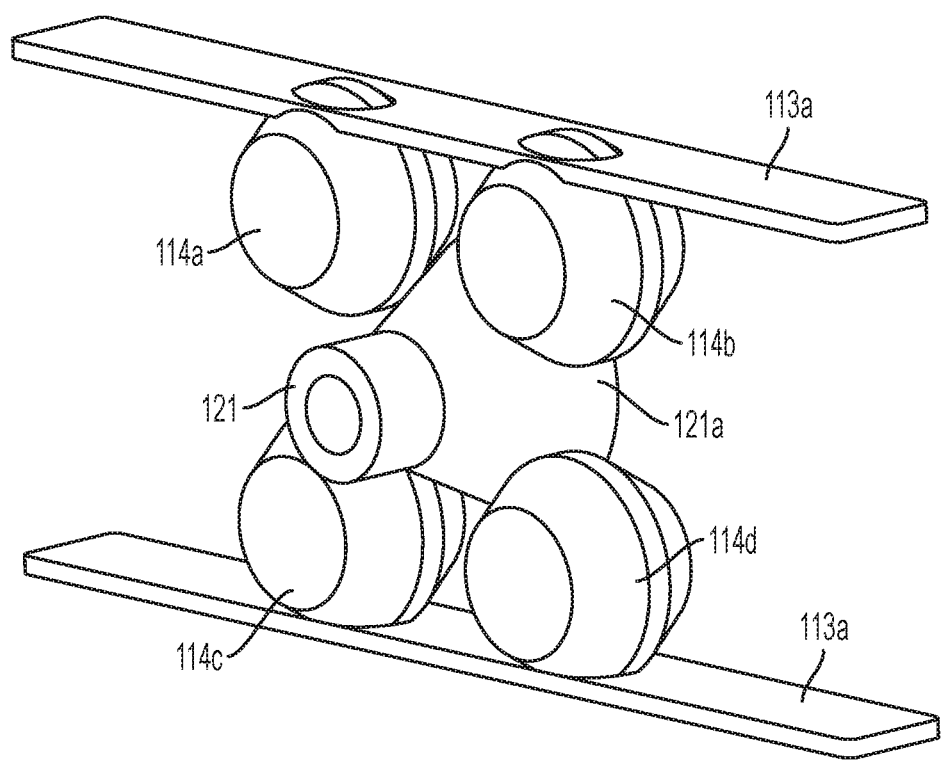
FIG. 4B illustrates the point of contacts in a coupled breakaway retention device, according to an embodiment.

As shown in FIG. 4B, a retention knob of a retained member 120 can have four points of contact with a retention body 110 via its four retention members 114*a*, 114*b*, 114*c*, and 114*d*. In an embodiment, a retention knob of a retained member 120 may also have a fifth point of contact with a back supporting plate 115*a* of a retention body 110. In an embodiment, frictional force at one or more of the points of contact can varied to control and/or adjust a magnitude and/or a direction of a breakaway force. The frictional force at a point of contact may depend upon factors such as, without limitation, the area of the point of contact, and the material of the contacting surfaces (i.e., the material of the retention knob, the retention members, and/or the back support pate). In an embodiment, the frictional force may be varied by varying one or more of the above factors to control and/or adjust a magnitude and/or a direction of a breakaway force.

Figure 6:
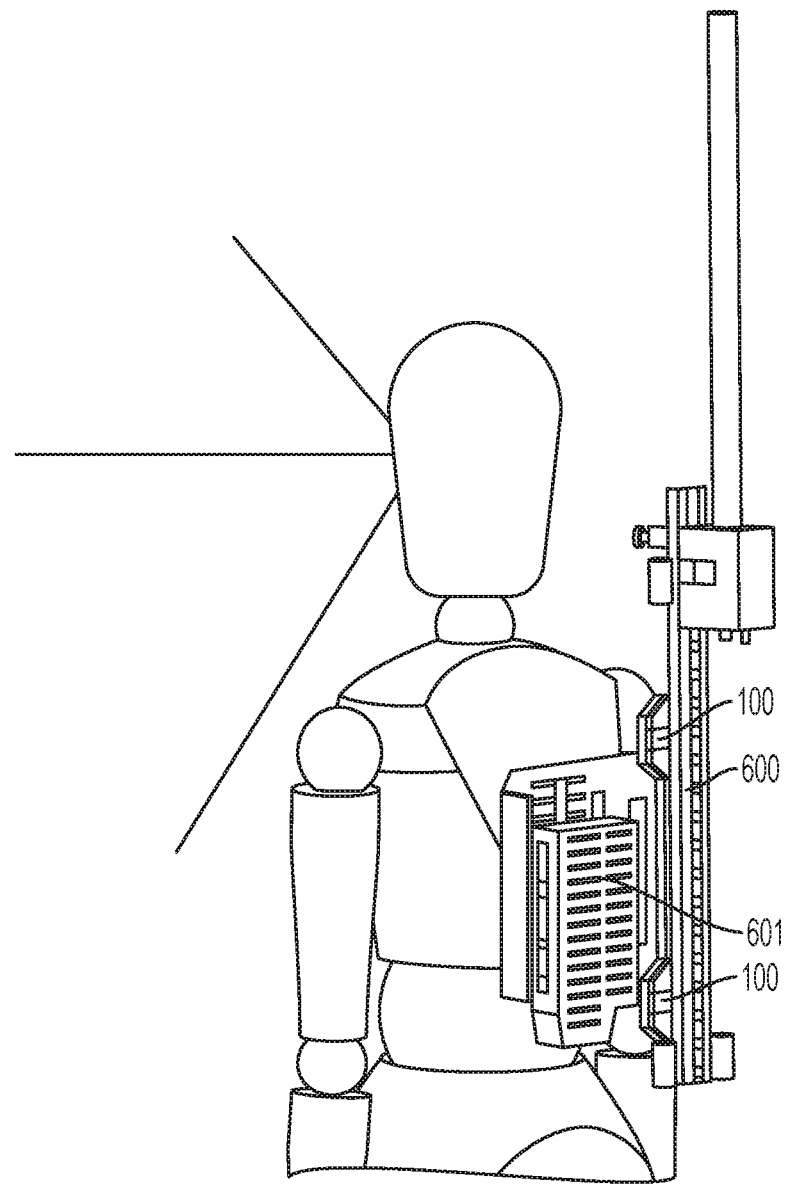
FIG. 6 illustrates an example application of a breakaway retention device, according to an embodiment.

FIG. 6 illustrates an example application of a breakaway retention device 100 for providing mounting support for an extendible personal antenna device 600. As such, a retention body 110 or a retained member 120 of the breakaway retention device 100 may be securely attached to a secure and stable mounting or positioning of equipment. 601 on the body of a person or the like. Furthermore, the complementary retained member 120 or the retention body 110 may be attached to the extendible personal antenna device 600. In an embodiment, the extendible personal antenna device 600 may be detached from the mounting equipment and/or extended by application (when the retention device is used to lock the extension mechanism) of a breakaway force. In an embodiment, more than one breakaway retention device may be used for providing the mounting support.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

We claim:

1. A breakaway retention device, comprising:
   a retained member comprising a retention knob disposed on a post extending from a backing plate, the retention knob comprising a frustroconical element including a tapered portion extending from the post and having a diameter that increases in a direction away from the backing plate to define a free end with a larger diameter than an opposing end coupled to the post; and
   a retention body comprising a housing, wherein the housing comprises:
      one or more resilient components,
      two or more retention members, and
      a retention space at least partially defined by the retention members and configured to receive the retention knob when the retained member and the retention body are coupled together;
   wherein the resilient components are disposed to resiliently maintain each of the retention members in a predetermined engagement position in the retention body to engage the retention knob when the retained member and the retention body are coupled together, whereby the retained member and the retention body are prevented from being decoupled without the application of a predetermined force; and
   wherein the tapered portion of the retention knob slidingly engages angled surfaces of the retention members when a force is applied to the retention knob in a direction away from the retention body, the sliding engagement of the tapered portion and the angled surfaces causes the retention members to respectively travel in directions towards the resilient components.

2. The breakaway retention device of claim 1, wherein the housing comprises:
   two resilient components; and
   two pairs of retention members;
   wherein each of the retention members is resiliently maintained around a periphery of the retention space.

3. The breakaway retention device of claim 1, wherein:
   the housing further comprises a back supporting plate, and one or more supporting structures;
   at least a portion of each of the retention members is shaped as a frustum, wherein the frustum shaped portion of a retention member comprises a smaller diameter base portion adjacent to the back supporting plate and a larger diameter base portion that is spaced away from the back supporting plate; and
   the retention space has a larger size adjacent to the back supporting plate and a smaller size adjacent to an aperture, wherein the aperture is formed at least in part by larger diameter base portions of the retention members disposed around the periphery of the retention space.

4. The breakaway retention device of claim 3, wherein the free end of the retention knob is configured to be received in the retention space.

5. The breakaway retention device of claim 4, wherein the free end of the retention knob is adjacent to the back supporting plate of the housing when the retention body is coupled to the retained member.

6. The breakaway retention device of claim 5, wherein the free end of the retention knob cannot pass through the aperture of the retention space when the resilient components are in a resting state.

7. The breakaway retention device of claim 6, wherein:
   the retention body can be coupled to the retained member by insertion of the free end of the retention knob in the retention space such that the free end is securely held in place in the retention space close to the back supporting plate; and
   the retention body can be decoupled from the retained member upon application of a breakaway force.

8. The breakaway retention device of claim 7, wherein:
   the application of the breakaway force causes flexing of one or more of the resilient components; and
   the flexing of one or more of the resilient components causes movement of one or more of the retention members such that a size of the aperture increases, and the free end of the retention knob can pass through the aperture of the retention space.

9. The breakaway retention device of claim 7, wherein a breakaway force required to decouple the retention body from the retained member when the retention body and the retained member are coupled together is adjusted using one or more of the following:
   characteristics of the one or more resilient components;
   shape and material of the two or more retention members;
   a size of a contact area between the retention knob and a portion of the retention body.

10. The breakaway retention device of claim 9, wherein adjusting the breakaway force comprises adjusting a magnitude or a direction of application of the breakaway force.

11. The breakaway retention device of claim 7, wherein a breakaway force required to decouple the retention body from the retained member when the retention body and the retained member is not confined to a particular direction for application of the breakaway force.

12. The breakaway retention device of claim 1, wherein:
   the housing comprises a plurality of channels, wherein each of the plurality of channels includes a broad central region flanked by narrow ends; and
   each of the one or more resilient components is mounted in a corresponding one of the plurality of channels, such that each of the one or more resilient components can flex in a broad central region of the corresponding one of the plurality of channels.

13. The breakaway retention device of claim 1, wherein the one or more resilient components are selected from the group comprising: a compression spring, a leaf spring, an resilient rubber, and a tension spring.

14. The breakaway retention device of claim 1, wherein the retention body further comprises a fulcrum disposed adjacent to a resilient component and on a side of the resilient component that does not include a retention member.

15. The breakaway retention device of claim 14, wherein:
the fulcrum comprises a moving assembly configured to move the fulcrum to control movement of a retention member corresponding to the resilient component; and
the controlling of the movement of the retention member is used to adjust a breakaway force required to decouple the retention body from the retained member when the retention body and the retained member are coupled together.

16. The breakaway retention device of claim 1, wherein at least one of the one or more resilient components includes a locking mechanism configured to prevent flexing of the at least one resilient component, and wherein preventing the flexing of the at least one resilient component:
increases a breakaway force required to decouple the retention body from the retained member when the retention body and the retained member are coupled together; or
prevents decoupling of the retention body from the retained member.

17. The breakaway retention device of claim 1, wherein:
each said resilient component has a first elongate length and a first axis along which the first elongate length extends;
the retention space has a second elongate length and a second axis along which second elongate length extends;
the second axis of the retention space extends parallel to the first axis of the resilient component.

18. A method for providing breakaway coupling of two components, comprising:
securely attaching one of two components to either one of a retention body or a retained member of a breakaway retention device;
securely attaching other one of the two components to other one of either the retention body or the retained member of the breakaway retention device; and
coupling the retained member to the retention body to provide breakaway coupling of the two components, wherein:
the retained member comprises a retention knob disposed on a post extending from a backing plate, the retention knob comprising a frustroconical element including a tapered portion extending from the post and having a diameter that increases in a direction away from the backing plate to define a free end with a larger diameter than an opposing end coupled to the post, and
the retention body having a housing that comprises:
one or more resilient components,
two or more retention members, and
a retention space at least partially defined by the retention members and configured to receive the retention knob when the retained member and the retention body are coupled together;
wherein the resilient components are disposed to resiliently maintain each of the retention members in a predetermined engagement position in the retention body to engage the retention knob when the retained member and the retention body are coupled together, whereby the retained member and the retention body are prevented from being decoupled without the application of a predetermined force; and
wherein the tapered portion of the retention knob slightly engages angled surfaces of the retention members when a force is applied to the retention knob, the slidingly engagement of the tapered portion and the angled surfaces causes the retention members to respectively travel in directions towards the resilient components.

19. The method of claim 18, wherein the housing comprises:
two resilient components; and
a pair of retention members,
wherein each of the retention members is resiliently maintained around a periphery of the retention space.

20. The method of claim 19, wherein:
the housing further comprises a back supporting plate, and one or more supporting structures;
at least a portion of each of the retention members is shaped as a frustum, wherein the frustum shaped portion of a retention member comprises a smaller diameter base portion adjacent to the back supporting plate and a larger diameter base portion that is spaced away from the back supporting plate; and
the retention space has a larger size adjacent to the back supporting plate and a smaller size adjacent to an aperture, wherein the aperture is formed at least in part by larger diameter base portions of the retention members disposed around the periphery of the retention space.

21. The method of claim 20, wherein the free end of the retention knob is configured to be received in the retention space.

* * * * *